US009965304B2

(12) United States Patent
Tsirkin

(10) Patent No.: US 9,965,304 B2
(45) Date of Patent: *May 8, 2018

(54) DELAYED HARDWARE UPGRADES IN VIRTUALIZATION SYSTEMS

(71) Applicant: Red Hat Israel, Ltd., Raanana (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 307 days.

This patent is subject to a terminal disclaimer.

(21) Appl. No.: 13/919,062

(22) Filed: Jun. 17, 2013

(65) Prior Publication Data

US 2013/0275979 A1    Oct. 17, 2013

Related U.S. Application Data

(63) Continuation of application No. 12/845,129, filed on Jul. 28, 2010, now Pat. No. 8,484,653.

(51) Int. Cl.
*G06F 9/455* (2006.01)
*G06F 15/177* (2006.01)
*G06F 9/46* (2006.01)

(52) U.S. Cl.
CPC ...... *G06F 9/45533* (2013.01); *G06F 9/45558* (2013.01); *G06F 9/46* (2013.01); *G06F 15/177* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,506,037 B1 * | 3/2009 | Ciano et al. | 709/220 |
| 7,574,048 B2 | 8/2009 | Shilman et al. | |
| 7,721,292 B2 * | 5/2010 | Frasier | G06F 9/505 709/226 |
| 7,865,893 B1 * | 1/2011 | Omelyanchuk | G06F 11/3644 710/1 |
| 8,117,435 B2 * | 2/2012 | Kuang et al. | 713/100 |
| 8,566,568 B2 * | 10/2013 | Michalak | G06F 9/30145 712/214 |

(Continued)

OTHER PUBLICATIONS

USPTO, Office Action for U.S. Appl. No. 12/845,129 dated Sep. 28, 2012.

(Continued)

*Primary Examiner* — Abu Zar Ghaffari
(74) *Attorney, Agent, or Firm* — Lowenstein Sandler LLP

(57) ABSTRACT

A system for delayed hardware upgrades in virtualization systems is disclosed. A method of the disclosure includes maintaining, by a hypervisor of a host machine, a delayed hardware upgrade mode that is applicable to virtual machines (VMs) managed by the hypervisor, receiving, by the hypervisor, a command to change VM hardware of one of the VMs managed by the hypervisor, placing, per the delayed hardware upgrade mode maintained by the hypervisor, the command in a delayed command queue associated with the VM to which the command was directed, the delayed command queue maintained by the hypervisor, and executing, by the hypervisor, the command in the delayed command queue when it is determined that the VM has been rebooted, wherein the reboot of the VM is not directly associated with the command.

18 Claims, 4 Drawing Sheets

(56) References Cited

U.S. PATENT DOCUMENTS

| | | | |
|---|---|---|---|
| 8,612,971 B1* | 12/2013 | Fitzgerald | G06F 9/45533 718/1 |
| 2004/0059840 A1* | 3/2004 | Perego | G06F 13/1605 710/6 |
| 2004/0187152 A1* | 9/2004 | Francis | H04L 12/2803 725/58 |
| 2007/0074199 A1* | 3/2007 | Schoenberg | 717/168 |
| 2007/0168641 A1* | 7/2007 | Hummel et al. | 711/206 |
| 2008/0115126 A1* | 5/2008 | Nakano et al. | 718/1 |
| 2008/0134176 A1* | 6/2008 | Fitzgerald | G06F 9/45537 718/1 |
| 2008/0163239 A1 | 7/2008 | Sugumar et al. | |
| 2008/0256530 A1* | 10/2008 | Armstrong et al. | 717/174 |
| 2009/0070760 A1* | 3/2009 | Khatri | G06F 9/4856 718/1 |
| 2009/0100420 A1* | 4/2009 | Sapuntzakis et al. | 717/171 |
| 2009/0249334 A1* | 10/2009 | Yamaguchi | G06F 9/4443 718/1 |
| 2009/0249366 A1* | 10/2009 | Sen et al. | 719/327 |
| 2010/0011201 A1* | 1/2010 | Ahn | G06F 9/4411 713/2 |
| 2010/0250824 A1 | 9/2010 | Belay | |
| 2010/0293266 A1* | 11/2010 | Schilling et al. | 709/224 |
| 2010/0299666 A1* | 11/2010 | Agbaria | G06F 9/4856 718/1 |
| 2011/0161955 A1 | 6/2011 | Woller et al. | |
| 2011/0197185 A1* | 8/2011 | Hobbet et al. | 717/168 |
| 2011/0231839 A1* | 9/2011 | Bennett et al. | 718/1 |
| 2011/0265076 A1* | 10/2011 | Thorat et al. | 717/172 |
| 2012/0011254 A1 | 1/2012 | Jamjoom et al. | |

OTHER PUBLICATIONS

USPTO, Notice of Allowance for U.S. Appl. No. 12/845,129 dated Mar. 8, 2013.

* cited by examiner

DELAYED HARDWARE UPGRADES IN VIRTUALIZATION SYSTEMS

RELATED APPLICATION

This application is a continuation of U.S. patent application Ser. No. 12/845,129, filed on Jul. 28, 2010, issued as U.S. Pat. No. 8,484,653 on Jul. 9, 2013, the entirety of which is incorporated herein by reference.

TECHNICAL FIELD

The embodiments of the invention relate generally to virtualization systems and, more specifically, relate to delayed hardware upgrades in virtualization systems.

BACKGROUND

A typical virtualization system consists of a guest operating system (OS) running within a virtual machine (VM). The VM is emulated by a hypervisor as a physical machine to the guest OS. The VM is usually controlled by a guest administrator. In addition, a virtualization system includes a hypervisor that manages one or more VMs on a single physical machine (a host). The hypervisor controls how each VM will behave. Lastly, a virtualization system may include a virtualization management tool that controls one or more hypervisors. This virtualization management tool may be used by a datacenter manager.

As with physical machines, VMs can differ significantly in the kind of hardware available to them, which can be emulated hardware or real host hardware that the hypervisor makes accessible to the VM. Examples of hardware that is emulated include CPU features, message signaled support in a network card, amount of RAM, etc. In some cases, this emulated hardware cannot change for a VM if the guest OS of the VM is running.

Sometimes, management may give a command that requires VM hardware different from what is currently presented to the VM. For example, during live migration, a VM is moved between hypervisors. In some cases, there may be hypervisors or physical machines that might not support a feature that is currently in use by the VM hardware or may not support the hardware itself.

If VM hardware is not supported, this typically means that changes and/or updates are needed to the VM hardware. Currently, such changes require VM downtime for shutting down the VM and restarting it with new VM hardware. These changes also require that a datacenter manager should have access to the VM with a VM administrator role, which may result in security issues. Another current solution is to have redundant VMs at the VM level or present redundant VM hardware for a VM, so that a VM can be updated without resulting in a noticeable shutdown of the VM to an end user. However, this kind of redundancy is often impossible or it complicates life for a VM administrator. Yet another solution is to implement a hot plug capability where a VM is notified of hardware changes and then the VM must acknowledge this before moving on. However, this technique may only work for some VM hardware/VM OS configurations. It also requires VM cooperation which can be time-consuming, and involves some downtime while the device is reconfigured.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
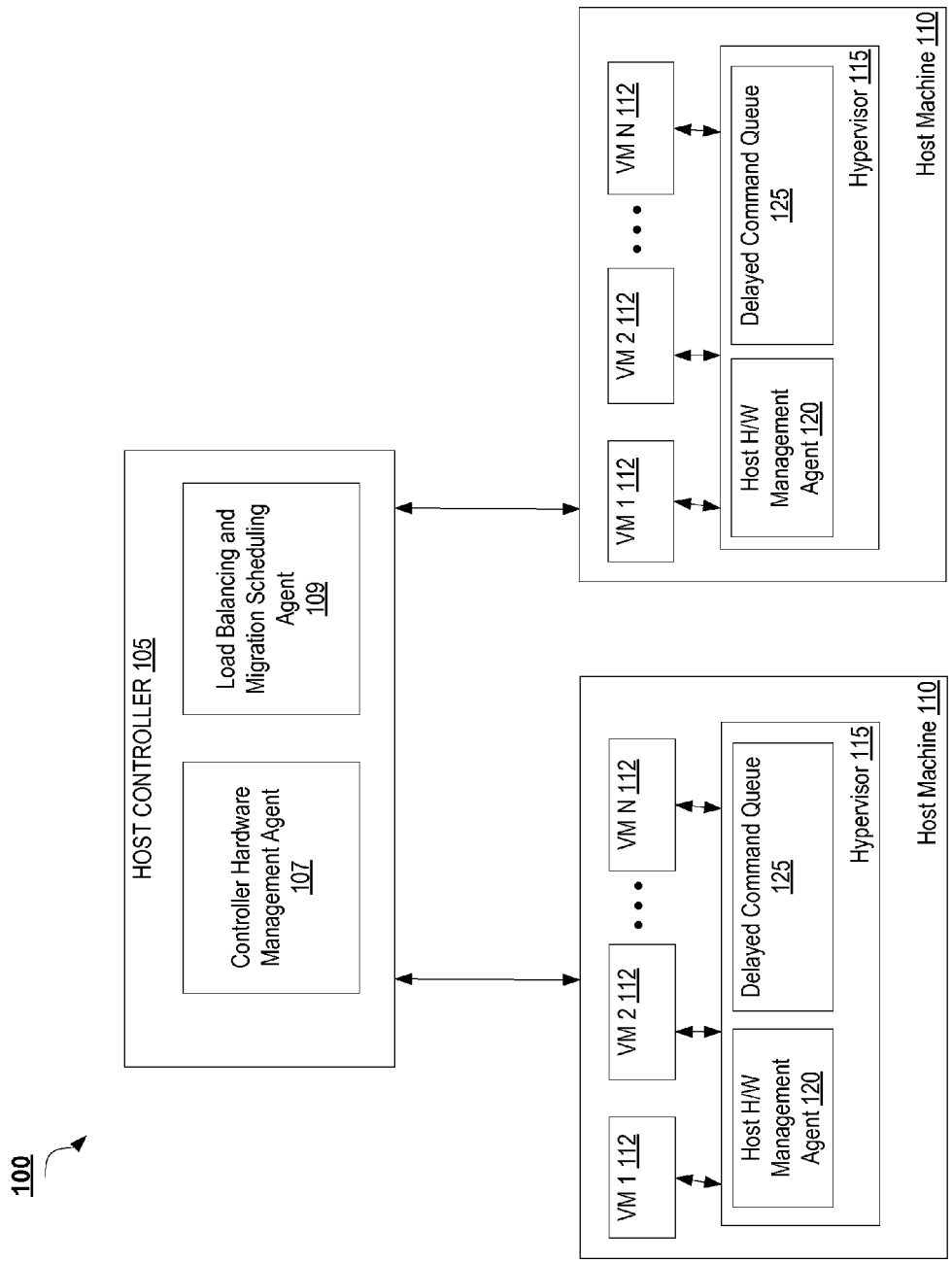
FIG. 1 is a block diagram of an exemplary virtualization architecture in which embodiments of the present invention may operate.

Embodiments of the invention provide a mechanism for delayed hardware upgrades in virtualization systems. A method of embodiments of the invention includes maintaining, by a hypervisor of a host machine, a delayed hardware upgrade mode that is applicable to virtual machines (VMs) managed by the hypervisor, receiving, by the hypervisor, a command to change VM hardware of one of the VMs managed by the hypervisor, placing, per the delayed hardware upgrade mode maintained by the hypervisor, the command in a delayed command queue associated with the VM to which the command was directed, the delayed command queue maintained by the hypervisor, and executing, by the hypervisor, the command in the delayed command queue when it is determined that the VM has been rebooted, wherein the reboot of the VM is not directly associated with the command.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "starting", "placing", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for delayed hardware upgrades in virtualization systems. Specifically, embodiments of the invention modify the hypervisor and host controller to allow for a special "delayed mode" of the hypervisor. When the hypervisor is in this special "delayed mode", it can accept commands to change an emulated CPU of a VM it manages or any other hardware associated with the VM so that it does not perform these commands immediately. Instead, the commands are kept in a queue and delayed until a next regularly scheduled reboot of the VM that was to happen anyways (e.g., to apply a security update, etc.). In this way, VM downtime is reduced. If a VM is to be migrated, then the migration is also delayed until a VM reboot occurs.

FIG. 1 illustrates an exemplary virtualization architecture 100 in which embodiments of the present invention may operate. The virtualization architecture 100 may include one or more host machines 110 to run one or more virtual machines (VMs) 112. Each VM 112 runs a guest operating system (OS) that may be different from one another. The guest OS may include Microsoft™ Windows™, Linux™, Solaris™, Mac™ OS, etc. The host machine 110 may include a hypervisor 115 that emulates the underlying hardware platform for the VMs 112. The hypervisor 115 may also be known as a virtual machine monitor (VMM), a kernel-based hypervisor or a host operating system.

In one embodiment, each VM 112 may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110 as a local client. In one scenario, the VM 112 provides a virtual desktop for the client.

As illustrated, the host 110 may be coupled to a host controller 105 (via a network or directly). In some embodiments, the host controller 105 may reside on a designated computer system (e.g., a server computer, a desktop computer, etc.) or be part of the host machine 110 or another machine. The VMs 112 can be managed by the host controller 105, which may add a VM, delete a VM, balance the load on the server cluster, provide directory service to the VMs 112, and perform other management functions.

In embodiments of the invention, the hypervisor 115 includes a host hardware management agent 120 and a delayed command queue 125, while the host controller 105 includes a controller hardware management agent 107. In some embodiments, these components 107, 120, 125 are used together to implement delayed hardware upgrades. In some embodiments, the host hardware management agent 120 may also be capable of emulating hardware for a VM 112.

More specifically, the host hardware management agent 120 of the hypervisor 115 may operate in a special "delayed mode," where the host hardware management agent 107 can accept commands to change VM hardware for a VM 112 that it manages, but not perform these commands immediately. Instead, the commands are placed in the delayed command queue 125 to be executed at the next reboot of the VM 112, for example a regularly scheduled reboot to apply a security update. In this way, downtime for the VM 112 is reduced. In other words, when a command that requires a VM 112 to reboot is issued, the hypervisor 115 can queue this command and delay it to be performed later when an administrator of the VM 112 reboots the VM.

In some embodiments, each VM 112 managed by the hypervisor 115 has its own delayed command queue 125 associated with it. In one embodiment, the delayed command queue 125 of a VM 112 may be displayed to an administrator or the contents of the command queue 125 may be provided to the hypervisor 115 for manipulation. For example, such manipulation may include canceling conflicting commands so that the commands are not executed: either detected by management or by hypervisor itself.

Additionally, the controller hardware management agent 107 of the host controller 105 may be configured to use a special delayed mode when VM hardware changes to a VM 112 are needed. The controller hardware management agent 107 of the host controller 105 is utilized in cases of migration and load balancing of VMs 112 between multiple hypervisors 115 in conjunction with the load balancing and migration scheduling agent 109 of host controller 105. The controller hardware management agent 107 should be aware of incompatible hardware arrangements between a VM 112 and a hypervisor 115 receiving that VM 122, and be able to cause the migration or load balancing to be delayed until the hardware becomes compatible (e.g., after reboot of the VM 112). To this end, the controller hardware management agent 107 sends a command to the originating hypervisor 115 to change the hardware configuration for a VM 112 upon the next reboot of the VM 112.

For instance, the controller hardware management agent 107 may auto-detect when hardware changes are needed for an operation. Then, the agent 107 uses the special delayed mode to prevent the migration or load balancing operation of scheduling agent 109 from immediately occurring. In some embodiments, the controller hardware management agent 107 sends a delay execution command to the scheduling agent 109 to prevent the migration or load balancing operation from occurring. In other embodiments, the command to migrate or load balance the VM is simply added to a delay queue (not shown) accessible by the scheduling agent 109 to reference commands that should not be immediately executed. Upon reboot of the VM 112, the originating hypervisor 115 reports the completion of the delayed hardware upgrade command to the controller hardware management agent 107. Then, once the hypervisor 115 indicates in this way that the incompatible hardware has changed, the scheduling agent 109 is given the go-ahead from the controller hardware management agent 107 to perform the migration or load balancing operation or the command may be removed from the delay queue that is referenced by the scheduling agent 109.

In some embodiments, the controller hardware management agent 107 may also be updated to give feedback to a datacenter manager (not shown) when hardware changes are outstanding. The data center manager may be an individual person or may also be an application. The controller hardware management agent 107 can also give visual or audio feedback to the datacenter manager as hardware upgrade operations progress, for example, from "waiting for reboot" to "changes applied". Furthermore, in some embodiments, the host hardware management agent 120 can also send messages to a VM administrator telling the administrator that a reboot is needed for a hardware change, so that the VM administrator may cause the reboot to be performed sooner if it was planned anyway.

An illustrative example of embodiments of the invention is now detailed. The following example assumes that a hardware change is needed for "live migration" of a VM across host machines running different hypervisor versions, e.g. from hypervisor version 1.0 to hypervisor version 2.0. It is known that hypervisor 1.0 does not support emulating message signaled interrupts (MSI), while hypervisor 2.0 does. If live migration is desired from a 1.0 version hypervisor, previous solutions would have started hypervisor 2.0 with MSI undeclared. This is because the MSI cannot be declared without a reboot or hotplug, which would cause additional downtime of the VM 112 above any other scheduled downtime the VM 112 already had planned.

In contrast, embodiments of the invention enable the hardware management agent 120 of the hypervisor 115 to perform the following pseudo commands:
 start delayed
 set msi=undeclare
In this way, the next time the VM reboots, e.g. for kernel upgrade, it will see the MSI undeclared after that reboot. A similar process may also be performed for other features and hardware, such as CPUID features, etc.

Figure 2:
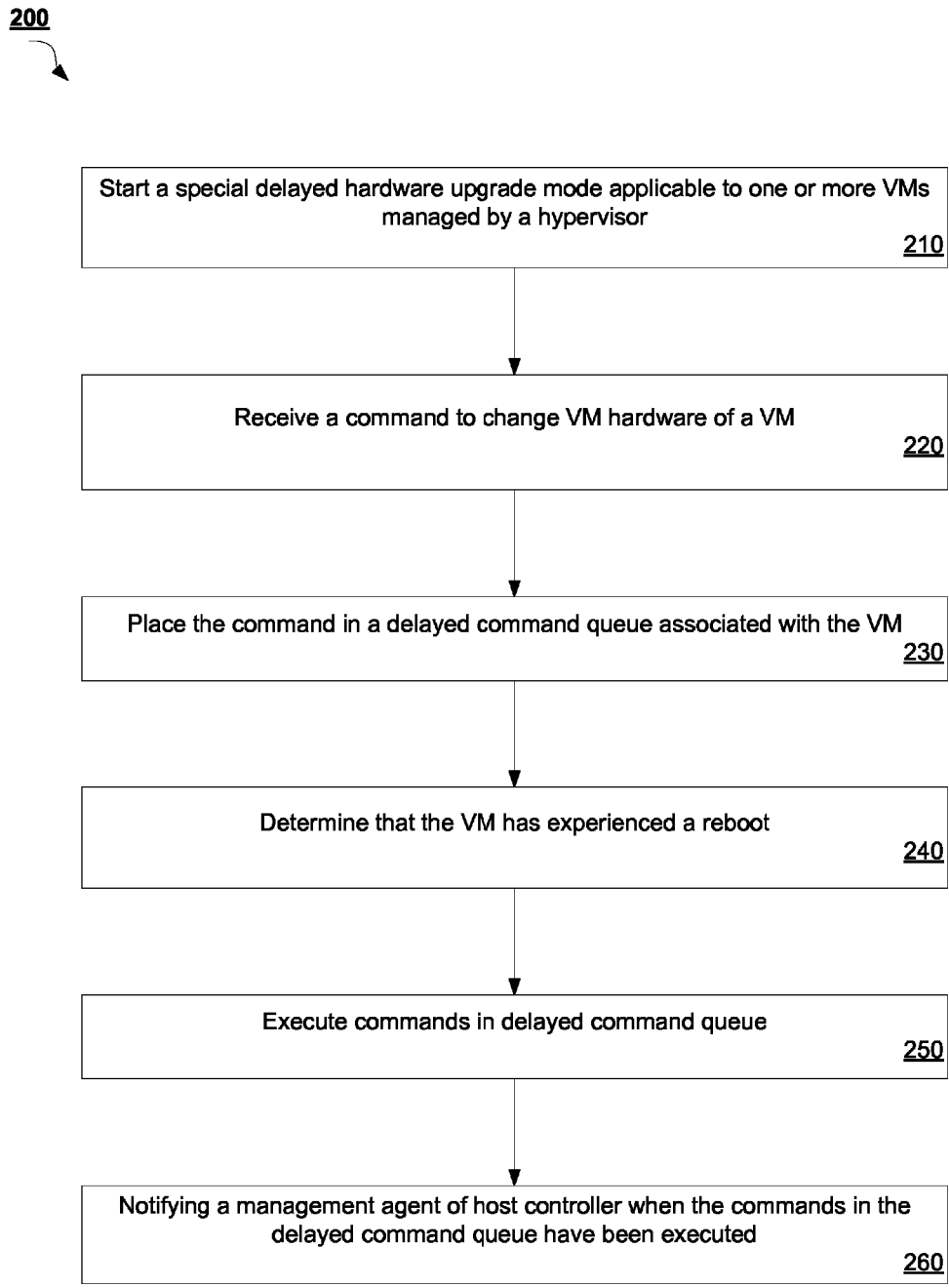
FIG. 2 is a flow diagram illustrating a method performed by a hypervisor for delayed hardware upgrades in virtualization systems according to an embodiment of the invention.

FIG. 2 is a flow diagram illustrating a method 200 performed by a hypervisor for delayed hardware upgrades in virtualization systems according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by hypervisor 115 of FIG. 1.

Method 200 begins at block 210 where a special delayed hardware upgrade mode is started by a hypervisor. In some embodiments, the special delayed hardware upgrade mode is enabled upon initialization of the hypervisor. In other embodiments, a triggering event, such as the host controller providing an instruction to the hypervisor, enables the special delayed hardware upgrade mode. The special delayed hardware mode is applicable to one or more VMs managed by the hypervisor. In one embodiment, a hardware management agent of the hypervisor implements the special delayed hardware mode. Then, at block 220, a command to change VM hardware of a VM is received.

At block 230, instead of being executed, the command is placed in a delayed command queue associated with the VM. In one embodiment, the delayed command queue is part of the hypervisor. Subsequently, at block 240, the hypervisor determines that the VM has been rebooted. For example, the reboot of the VM may be part of regularly-scheduled maintenance of the VM. At this point, any commands that were placed in the delayed command queue are executed at block 250. Lastly, at block 260, the hypervisor notifies a management agent of the host controller that the commands in the delayed command queue have been executed.

Figure 3:
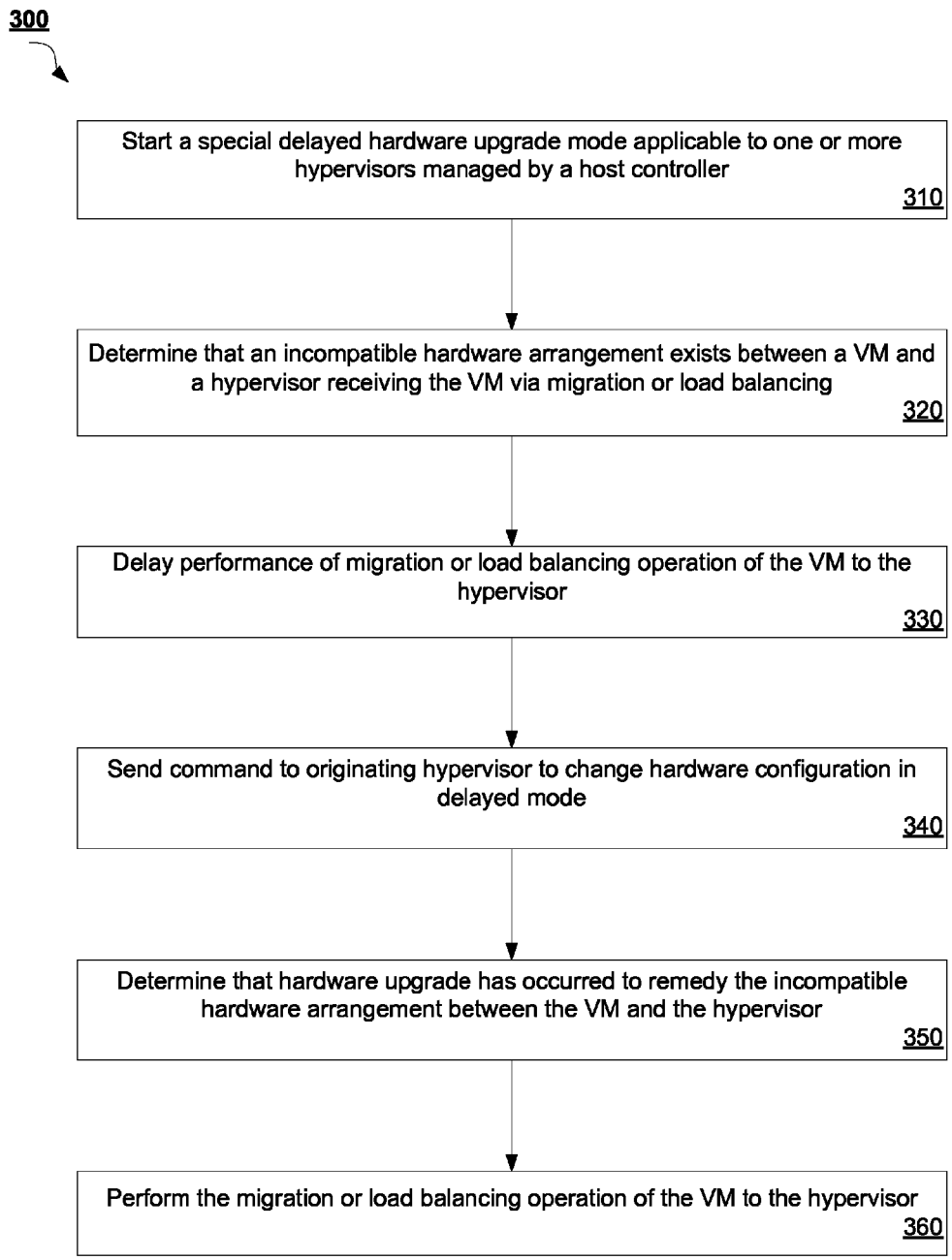
FIG. 3 is a flow diagram illustrating a method performed by a host controller for delayed hardware upgrades in virtualization systems according to an embodiment of the invention.

FIG. 3 is a flow diagram illustrating a method 300 performed by a host controller for delayed hardware upgrades in virtualization systems according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by host controller 105 of FIG. 1.

Method 300 begins at block 310 where a special delayed hardware upgrade mode that is applicable to one or more hypervisors managed by a host controller is enabled by the host controller. In some embodiments, the special delayed hardware upgrade mode is enabled upon initialization of the hypervisor. In other embodiments, a triggering event, such as the host controller providing an instruction to the hypervisor, enables the special delayed hardware upgrade mode. In one embodiment, a hardware management agent of the host controller implements the special delayed hardware upgrade mode. Then, at block 320, it is determined that an incompatible hardware arrangement exists between a VM and a hypervisor of a host machine receiving the VM via a migration or load balancing operation of the host controller. In one embodiment, an incompatible hardware arrangement may be one where the hypervisor receiving the VM is unable to implement certain VM hardware features of the VM.

Subsequently, at block 330, the performance of the migration or load balancing operation of the VM to the hypervisor by the host controller is delayed. In one embodiment, delaying the migration or load balancing operation includes a controller hardware management agent of the host controller sending a delay signal to a scheduling agent of the host controller. In another embodiment, delaying the migration or load balancing operation includes placing the migration or load balancing command in a delay queue managed by the host controller.

Then, at block 340, a command is sent to the originating hypervisor to change the hardware configuration in delayed mode. The result will be that after the next reboot, the VM will see the new compatible hardware. At block 350, it is determined that a hardware upgrade has occurred that remedies the incompatible hardware arrangement that existed between the VM and the hypervisor receiving the VM.

In response to this determination, the host controller performs the migration or load balancing operation of the VM to the hypervisor at block 360. In one embodiment, performing the migration or load balancing operation includes the controller hardware management agent instructing the scheduling agent to proceed with the migration or load balancing operation. In another embodiment, performing the migration or load balancing operation includes removing the migration or load balancing command from the delay queue of the host controller.

Figure 4:
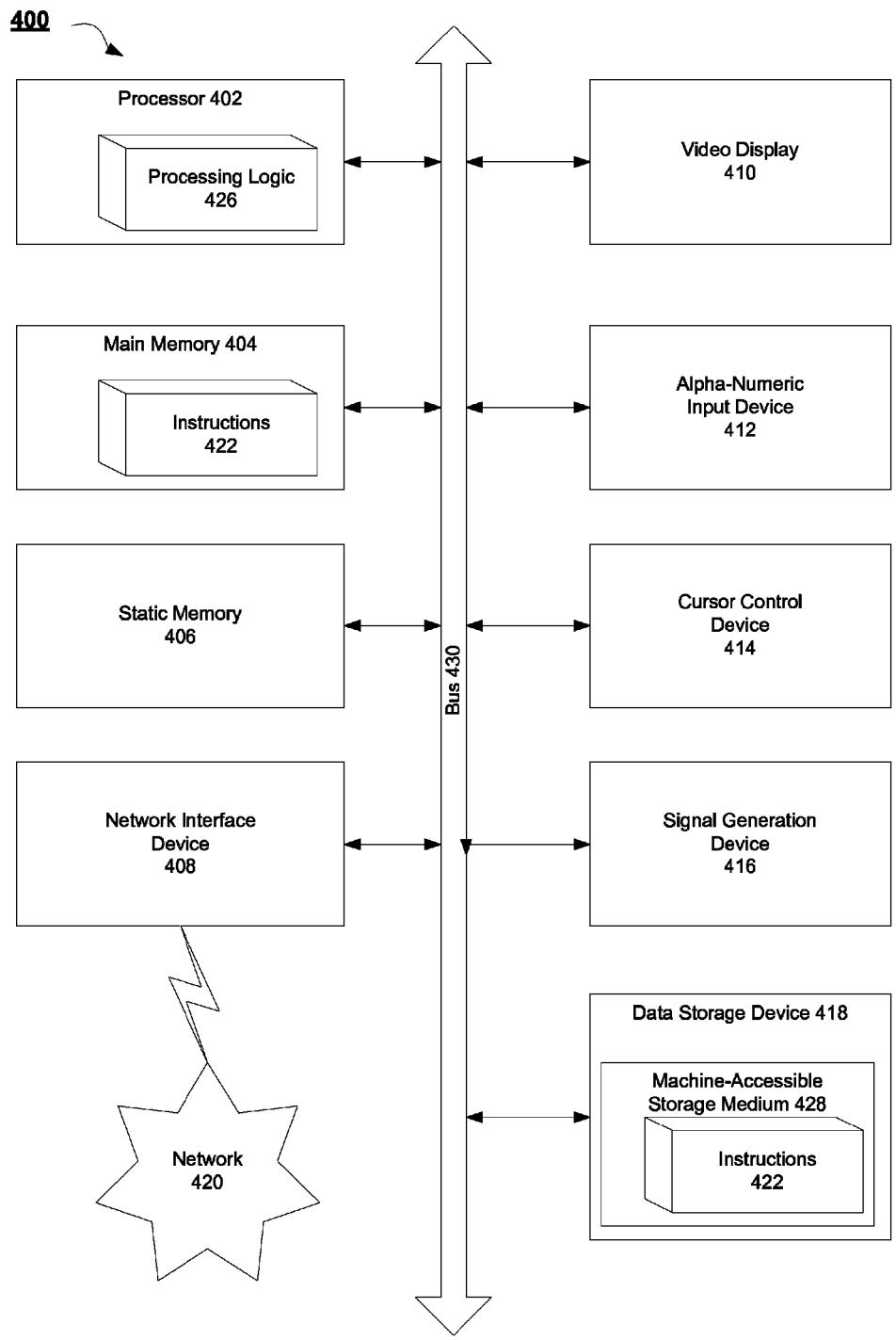
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform delayed hardware upgrades in virtualization systems by hypervisor 115 and/or host controller 105 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform method 200 or 300 for delayed hardware upgrades in virtualization systems described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:

maintaining, by an originating hypervisor executed by a processing device, a delayed hardware upgrade mode that is applicable to virtual machines (VMs) managed by the originating hypervisor;

receiving, by the originating hypervisor, a first command to change virtual machine (VM) hardware of a first VM of the VMs managed by the originating hypervisor and a second command to migrate the first VM to a destination hypervisor;

placing, per the delayed hardware upgrade mode maintained by the originating hypervisor, the first command in a delayed command queue associated with the first VM, wherein the delayed command queue is maintained by the originating hypervisor, and wherein the delayed command queue comprises a plurality of commands to be executed at a next reboot of the first VM;

responsive to detecting a hardware incompatibility between the first VM and the destination hypervisor, delaying, by the hypervisor, migration of the first VM until execution of the commands in the delayed command queue, wherein the execution of the commands is associated with applying a security update to the first VM; and responsive to determining that the first VM is rebooted, executing the commands in the delayed command queue, comprising:
  executing the first command to upgrade the VM hardware of the first VM to correspond with the destination hypervisor, wherein the reboot of the first VM is associated with regularly-scheduled maintenance of the first VM; and
  responsive to detecting that execution of the commands in the delayed command queue is complete, notifying, by the originating hypervisor, a host controller machine managing the originating hypervisor to execute the second command to migrate the first VM.

2. The method of claim 1, wherein a host hardware management agent of the originating hypervisor starts the delayed hardware mode.

3. The method of claim 1, further comprising removing the first command from the delayed command queue.

4. The method of claim 1, wherein the host controller machine to implement a special delay mode that prevents at least one of migration or load balancing of the first VM to the destination hypervisor of another host machine, the destination hypervisor having hardware incompatibilities with the first VM, wherein the special delay mode of the host controller machine prevents the at least one of the migration or the load balancing of the first VM until the hardware of the first VM has been upgraded by the originating hypervisor.

5. The method of claim 4, wherein in the special delay mode of the host controller machine the method further comprises:
  determining, by the host controller machine, that the VM hardware of the first VM is to be upgraded to resolve the hardware incompatibilities for the at least one of the migration or the load balancing operation;
  instructing, by the host controller machine, a scheduling agent of the host controller machine to delay the at least one of the migration or the load balancing operation of the first VM;
  instructing, by the host controller machine, the originating hypervisor to perform the upgrade to the VM hardware upon the reboot of the first VM; and
  starting, by the host controller machine, the at least one of the migration or the load balancing operation after the upgrade of the VM hardware is complete.

6. The method of claim 1, wherein, responsive to the first command being placed in the delayed command queue, notifying an administrator of the first VM that a reboot of the first VM is suggested to be performed.

7. The method of claim 1, further comprising:
  providing a notification that the first command in the delayed command queue to resolve the hardware incompatibility is executed.

8. The method of claim 1, further comprising cancelling at least one of the commands in the delayed command queue in view of a conflict between the commands in the delayed command queue.

9. A system, comprising:
  a processing device; and
  a memory communicably coupled to the processing device, the processing device to execute an originating hypervisor to:
    maintain a delayed hardware upgrade mode that is applicable to virtual machines (VMs) managed by the originating hypervisor;
    receive a first command to change virtual machine (VM) hardware of a first VM of the VMs managed by the originating hypervisor and a second command to migrate the first VM to a destination hypervisor;
    place, per the delayed hardware upgrade mode maintained by the hypervisor, the first command in a delayed command queue associated with the first VM, wherein the delayed command queue is maintained by the originating hypervisor, and wherein the delayed command queue comprises a plurality of commands to be executed at a next reboot of the first VM;
    responsive to detecting a hardware incompatibility between the first VM and the destination hypervisor, delay migration of the first VM until execution of the commands in the delayed command queue, wherein execution of the commands is associated with a security update being applied to the first VM; and
    responsive to determining that the first VM is rebooted, execute the commands in the delayed command queue, wherein the processing device is further to:
      execute the first command to upgrade the VM hardware of the first VM to correspond with the destination hypervisor, wherein the reboot of the first VM is associated with regularly-scheduled maintenance of the first VM; and
      responsive to detecting that execution of the commands in the delayed command queue is complete, notify a host controller machine managing the originating hypervisor to execute the second command to migrate the first VM.

10. The system of claim 9, wherein a host hardware management agent of the hypervisor starts the delayed hardware mode.

11. The system of claim 9, wherein the processing device is further to remove the first command from the delayed command queue.

12. The system of claim 9, wherein the host controller machine to implement a special delay mode that prevents at least one of migration or load balancing of the first VM to the destination hypervisor of another host machine, the destination hypervisor having hardware incompatibilities with the first VM, wherein the special delay mode of the host controller machine prevents the at least one of the migration or the load balancing of the first VM until the hardware of the first VM has been upgraded by the originating hypervisor.

13. The system of claim 12, wherein in the special delay mode of the host controller machine, the host controller machine is to:
  determine that the VM hardware of the first VM is to be upgraded to resolve the hardware incompatibilities for the at least one of the migration or the load balancing operation;
  instruct a scheduling agent of the host controller machine to delay the at least one of the migration or the load balancing operation of the first VM;
  instruct the originating hypervisor to perform the upgrade to the VM hardware upon the reboot of the first VM; and
  start the at least one of the migration or the load balancing operation after the upgrade of the VM hardware is complete.

14. The system of claim 9, wherein, responsive to the first command being placed in the delayed command queue, notify an administrator of the first VM that a reboot of the first VM is suggested to be performed.

15. A non-transitory machine-readable storage medium comprising instructions that, when executed by a processing device, cause the processing device to:

maintain, by an originating hypervisor executed by a processing device, a delayed hardware upgrade mode that is applicable to virtual machines (VMs) managed by the originating hypervisor;

receiving, by the originating hypervisor, a first command to change virtual machine (VM) hardware of a first VM of the VMs managed by the originating hypervisor and a second command to migrate the first VM to a destination hypervisor;

place, per the delayed hardware upgrade mode maintained by the originating hypervisor, the first command in a delayed command queue associated with the first VM, wherein the delayed command queue is maintained by the originating hypervisor, and wherein the delayed command queue comprises a plurality of commands to be executed at a next reboot of the first VM;

responsive to detecting a hardware incompatibility between the first VM and the destination hypervisor, delay migration of the first VM until execution of the commands in the delayed command queue, wherein the execution of the commands is associated with a security update being applied to the first VM; and responsive to determining that the first VM is rebooted, execute the commands in the delayed command queue, wherein the processing device is further to:

execute the first command to upgrade the VM hardware of the first VM to correspond with the destination hypervisor, wherein the reboot of the first VM is associated with regularly-scheduled maintenance of the first VM; and responsive to detecting that execution of the commands in the delayed command queue is complete, notify, by the originating hypervisor, a host controller machine managing the originating hypervisor to execute the second command to migrate the first VM.

16. The non-transitory machine-readable storage medium of claim 15, wherein the processing device is further to remove the first command from the delayed command queue.

17. The non-transitory machine-readable storage medium of claim 15, wherein the host controller machine to implement a special delay mode that prevents at least one of migration or load balancing of the first VM to the another hypervisor of another host machine, the another hypervisor having hardware incompatibilities with the first VM, wherein the special delay mode of the host controller machine prevents the at least one of the migration or the load balancing of the first VM until the hardware of the first VM has been upgraded by the originating hypervisor.

18. The non-transitory machine-readable storage medium of claim 17, wherein in the special delay mode of the host controller machine, the host controller machine to:

determine that the VM hardware of the first VM is to be upgraded to resolve the hardware incompatibilities for the at least one of the migration or the load balancing operation;

instruct a scheduling agent of the host controller machine to delay the at least one of the migration or the load balancing operation of the first VM;

instruct the originating hypervisor to perform the upgrade to the VM hardware upon the reboot of the first VM; and start the at least one of the migration or the load balancing operation after the upgrade of the VM hardware is complete.

* * * * *